United States Patent
Nishio et al.

(10) Patent No.: US 11,806,812 B2
(45) Date of Patent: Nov. 7, 2023

(54) LASER MACHINING DEVICE

(71) Applicant: Panasonic Intellectual Property Management Co., Ltd., Osaka (JP)

(72) Inventors: Masatoshi Nishio, Osaka (JP); Jingbo Wang, Hyogo (JP); Hitoshi Nishimura, Osaka (JP); Motoki Morioka, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 108 days.

(21) Appl. No.: 17/162,510

(22) Filed: Jan. 29, 2021

(65) Prior Publication Data

US 2021/0146481 A1    May 20, 2021

Related U.S. Application Data

(63) Continuation of application No. PCT/JP2019/007600, filed on Feb. 27, 2019.

(30) Foreign Application Priority Data

Aug. 7, 2018    (JP) ................. 2018-148541

(51) Int. Cl.
*B23K 26/70*    (2014.01)
*B23K 26/082*    (2014.01)
(Continued)

(52) U.S. Cl.
CPC ........ *B23K 26/705* (2015.10); *B23K 26/0648* (2013.01); *B23K 26/082* (2015.10); *B23K 26/38* (2013.01); *B23K 26/707* (2015.10)

(58) Field of Classification Search
CPC .............. B23K 26/705; B23K 26/0648; B23K 26/082; B23K 26/38; B23K 26/707;
(Continued)

(56) References Cited

U.S. PATENT DOCUMENTS

| 7,863,544 B2 * | 1/2011 | Serruys ................. B23K 26/21 219/121.83 |
| 10,166,630 B2 * | 1/2019 | Schwarz ............ G01B 11/0608 |

(Continued)

FOREIGN PATENT DOCUMENTS

| DE | 10 2011 007 176 | 10/2012 |
| DE | 10 2012 102 785 | 2/2013 |

(Continued)

OTHER PUBLICATIONS

International Search Report dated May 28, 2019 in International (PCT) Application No. PCT/JP2019/007600 with English translation.

(Continued)

*Primary Examiner* — Helena Kosanovic
*Assistant Examiner* — Thao Uyen Tran-Le
(74) *Attorney, Agent, or Firm* — Wenderoth, Lind & Ponack, L.L.P.

(57) ABSTRACT

A detector is configured to detect an output of a reflected beam from an exit end surface of a parallel plate. A determination unit is configured to determine that an abnormality occurs in the parallel plate when a detection value of the detector is smaller than a determination threshold.

8 Claims, 2 Drawing Sheets

(51) Int. Cl.
*B23K 26/06* (2014.01)
*B23K 26/38* (2014.01)

(58) Field of Classification Search
CPC .... B23K 26/046; B23K 26/064; G02B 7/102; G02B 7/28; G02B 27/14
See application file for complete search history.

(56) References Cited

U.S. PATENT DOCUMENTS

| | | | |
|---|---|---|---|
| 2005/0115940 A1 | 6/2005 | Matsushita et al. | |
| 2008/0239300 A1* | 10/2008 | Watanabe | G01J 1/0455 356/229 |
| 2013/0258321 A1* | 10/2013 | Jurca | G01N 21/94 356/73 |
| 2014/0042133 A1* | 2/2014 | Weick | B23K 26/707 219/121.81 |
| 2016/0193692 A1* | 7/2016 | Regaard | B23K 31/125 219/121.62 |
| 2016/0265030 A1* | 9/2016 | Tsukuda | C12Q 1/686 |
| 2017/0050267 A1* | 2/2017 | Kung | B23K 26/703 |
| 2017/0304939 A1 | 10/2017 | Rataj | |

FOREIGN PATENT DOCUMENTS

| | | | |
|---|---|---|---|
| DE | 101 13 518 | 5/2016 | |
| EP | 1488882 A1 * | 12/2004 | ........... B23K 26/702 |
| EP | 1 488 882 | 7/2006 | |
| JP | 05-212576 | 8/1993 | |
| JP | 2001-68429 | 3/2001 | |
| JP | 2002-361452 | 12/2002 | |
| JP | 2005-161361 | 6/2005 | |
| JP | 2011-104643 | 6/2011 | |
| JP | 2011104643 A * | 6/2011 | |
| JP | 2013-173176 | 9/2013 | |
| JP | 2015044212 A * | 3/2015 | ............ B23K 26/03 |
| JP | 2017-534463 | 11/2017 | |
| WO | 2012/139873 | 10/2012 | |
| WO | 2015/129249 | 9/2015 | |

OTHER PUBLICATIONS

Extended European Search Report dated Oct. 6, 2021 in counterpart European Patent Application No. 19847196.3.

* cited by examiner

LASER MACHINING DEVICE

CROSS-REFERENCE TO RELATED APPLICATIONS

This is a continuation of International Application No. PCT/JP2019/007600 filed on Feb. 27, 2019, which claims priority to Japanese Patent Application No. 2018-148541 filed on Aug. 7, 2018. The entire disclosures of these applications are incorporated by reference herein.

BACKGROUND

The present invention relates to a laser machining device.

It is known that high-power laser beams thermally distort optical elements in a machining head and cause thermal lens effect, which in turn changes the position of the focal point (i.e., a focal shift) (see, for example Japanese Translation of PCT International Application No. 2017-534463).

Japanese Translation of PCT International Application No. 2017-534463 discloses a configuration that compensates a focal shift by disposing, between an interface and a focusing optical unit, a deflecting assembly which serves as a passive optical element that changes the divergence of the laser beam in dependence on power.

SUMMARY

Thermal lens effect tends to occur when, as described above, a laser beam is output at high-power levels. It may also occur when, for example, fumes or dust created during laser machining adhere to an optical element and change the optical absorption coefficient of the optical element, which can readily lead to thermal distortion.

The present invention has been made in view of the foregoing, and it is an object of the present invention to make it possible to detect whether a focal shift caused by thermal lens effect occurs.

Aspects of the present disclosure are directed to a laser machining device that emits a laser beam, and the device has the following solutions.

That is, a laser machining device according to a first aspect includes: a collimate lens; a long-focus lens that focuses the laser beam which has passed through the collimate lens; a first parallel plate disposed closer to an outgoing side than the long-focus lens and inclined relative to an optical axis at a predetermined angle; and a first detector that detects an output of a reflected beam from an exit end surface of the first parallel plate.

In the first aspect, it is possible to detect whether a focal shift caused by thermal lens effect occurs in the first parallel plate by detecting the output of the reflected beam from the exit end surface of the first parallel plate.

Specifically, since the first parallel plate is disposed to the outgoing side of the laser beam, fumes or dust created in the laser machining are prevented from entering the device. On the other hand, contamination readily adheres to the exit end surface of the first parallel plate. When contamination is attached to the first parallel plate, the contaminated portion absorbs the laser beam and heats the first parallel plate, thereby causing thermal distortion.

It is therefore possible to detect whether a focal shift caused by thermal lens effect occurs in the first parallel plate by detecting the output of the reflected beam from the exit end surface of the first parallel plate and comparing the detected output with, for example, an output of a reflected beam from the exit end surface in the initial state without contamination.

A second aspect is an embodiment of the first aspect. In the second aspect, the laser machining device further includes a second detector that detects an output of a reflected beam from an entrance end surface of the first parallel plate.

In the second aspect, the output of the reflected beam from the entrance end surface of the first parallel plate is detected. It is possible to detect whether a focal shift caused by thermal lens effect occurs in the first parallel plate by comparing the output of the reflected beam from the exit end surface of the first parallel plate and the output of the reflected beam from the entrance end surface of the first parallel plate.

A third aspect is an embodiment of the second aspect. In the third aspect, the laser machining device further includes a second parallel plate disposed closer to an incoming side than the first parallel plate; and a third detector that detects an output of a reflected beam from an entrance end surface of the second parallel plate.

In the third aspect, the second parallel plate is disposed closer to the incoming side than the first parallel plate. Since the second parallel plate is disposed closer to the incoming side than the first parallel plate, fumes or dust created in the laser machining do not adhere to the second parallel plate. However, a focal shift due to thermal lens effect occurs if the second parallel plate has, for example, a distortion attributable to the raw material or if the laser beam is output at high-power levels.

In this regard, by detecting the output of the reflected beam from the entrance end surface of the second parallel plate and comparing the detected output with the output of the reflected beam from the entrance end surface of the first parallel plate, it is possible to detect whether a focal shift due to thermal lens effect occurs in the second parallel plate.

A fourth aspect is an embodiment of any one of the first to third aspects. In the fourth aspect, the laser machining device further includes a determination unit that determines that an abnormality occurs in the first parallel plate when a detection value of the first detector is smaller than a predetermined determination threshold.

In the fourth aspect, it is determined that an abnormality, such as adhesion of contamination, occurs in the first parallel plate when the detection value of the first detector is smaller than a predetermined determination threshold. Based on the result of the determination, measures can be taken such as correcting the focal shift of the first parallel plate and replacing or cleaning the first parallel plate.

A fifth aspect is an embodiment of the second aspect. In the fifth aspect, the laser machining device further includes a calculation unit that calculates an amount of a focal shift of the first parallel plate based on a detection value of the first detector and a detection value of the second detector.

In the fifth aspect, the amount of the focal shift of the first parallel plate is calculated based on the detection values of the first detector and the second detector. Based on the result of the calculation on the focal shift amount, the focal shift of the first parallel plate can be corrected.

A sixth aspect is an embodiment of the third aspect. In the sixth aspect, the laser machining device further includes a calculation unit that calculates an amount of a focal shift of the second parallel plate based on a detection value of the second detector and a detection value of the third detector.

In the sixth aspect, the amount of the focal shift of the second parallel plate is calculated based on the detection values of the second detector and the third detector. Based on the result of the calculation on the focal shift amount, the focal shift of the second parallel plate can be corrected.

A seventh aspect is an embodiment of any one of the first to sixth aspects. In the seventh aspect, the laser machining device further includes a position adjuster that moves the long-focus lens in a direction of the optical axis such that a detection value of the first detector exceeds a predetermined set value.

In the seventh aspect, the long-focus lens is moved in the direction of the optical axis and is adjusted such that the detection value of the first detector exceeds the predetermined set value.

Specifically, when contamination is attached to the first parallel plate, the contaminated portion absorbs the laser beam and reduces the laser output to or below 3000 W, for example. In this case, the long-focus lens is moved so that the laser output becomes maximum (e.g., 4000 W). The long-focus lens is automatically adjusted in this manner to maximize the detection value of the first detector, and the focal shift at the laser machining point can be corrected.

An eighth aspect is an embodiment of the seventh aspect. In the eighth aspect, the laser machining device further includes a warning unit that performs a predetermined warning operation when the detection value of the first detector is smaller than the set value after adjustment of a position of the long-focus lens.

In the eighth aspect, when the detection value of the first detector is smaller than the set value after adjustment of the position of the long-focus lens, a warning operation such as sounding a warning buzzer, lighting a warning lamp, or displaying a warning message is performed. This configuration can prompt an operator to replace or clean the first parallel plate.

A ninth aspect is an embodiment of the second aspect. In the ninth aspect, the laser machining device further includes a calculation unit that calculates a difference between a detection value of the first detector and a detection value of the second detector; and a determination unit that determines that an abnormality occurs in the first parallel plate when the difference is larger than a predetermined difference threshold.

In the ninth aspect, when the difference between the detection values of the first detector and the second detector is larger than a predetermined difference threshold, that is, when there is a certain difference between the two detection values, it is determined that an abnormality, such as adhesion of contamination, occurs in the first parallel plate. Based on the result of the determination, measures can be taken such as replacing or cleaning the first parallel plate.

A tenth aspect is an embodiment of any one of the first to ninth aspects. In the tenth aspect, the detector includes a lens that focuses a reflected beam, an aperture that blocks a reflected beam having a predetermined diameter, and a photodiode that detects an output of a reflected beam which has passed through the aperture.

In the tenth aspect, the lens, the aperture, and the photodiode serve as a detector. When a focal shift occurs in a parallel plate, the reflected beam that has passed through the aperture decreases, and the photodiode detects a smaller output of the reflected beam. The occurrence of the focal shift can be detected based on the detection result of the photodiode.

According to the aspects of the present disclosure, it is possible to detect whether a focal shift caused by thermal lens effect occurs in the parallel plate.

DESCRIPTION OF EMBODIMENTS

Embodiments of the present invention will be described in detail with reference to the drawings. Note that the following description of embodiments is merely an example in nature, and is not intended to limit the scope, applications, or use of the present invention.

Figure 1:
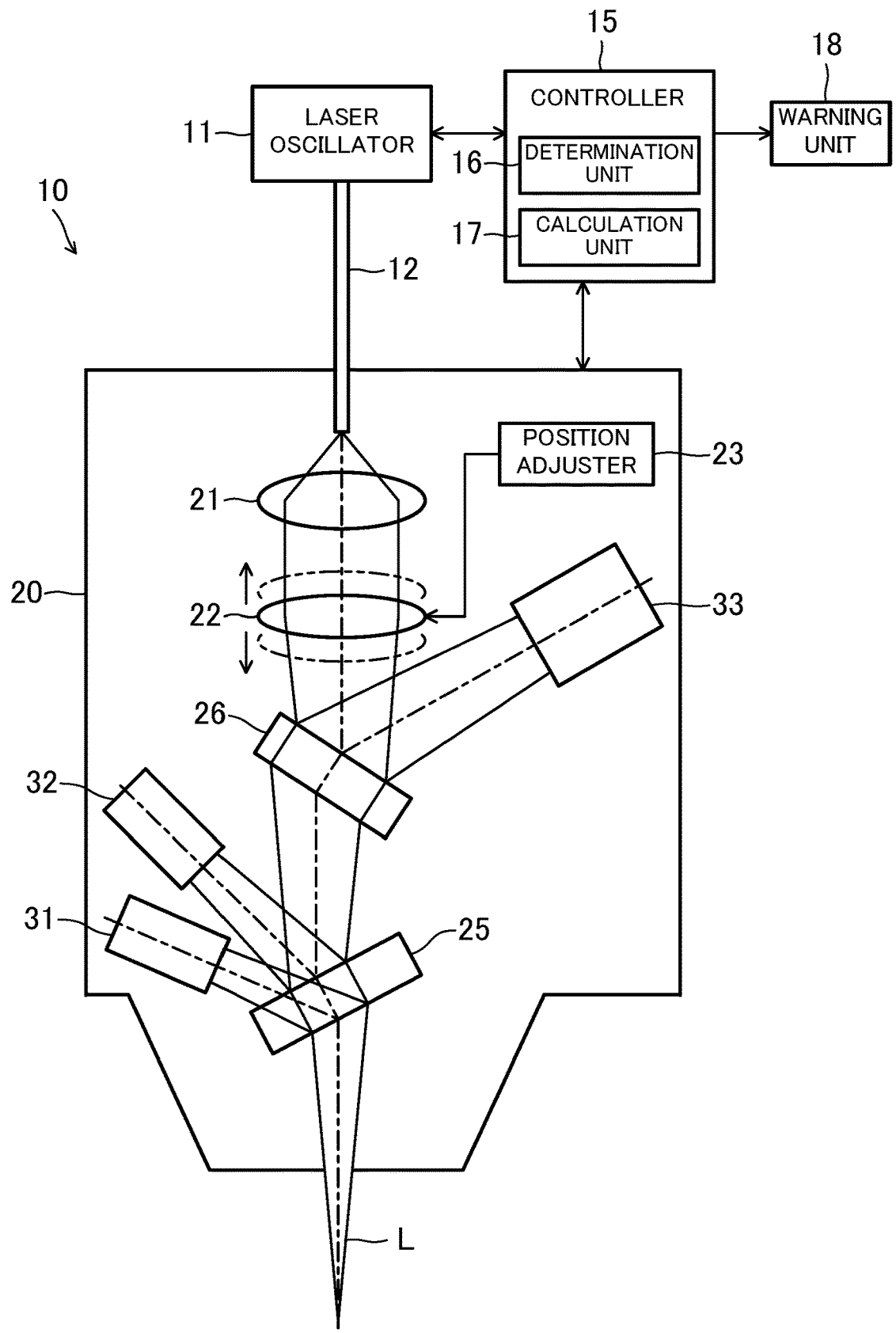
FIG. 1 is a side view illustrating a general configuration of a laser machining device according to an embodiment.

As illustrated in FIG. 1, a laser machining device 10 includes a laser oscillator 11 that outputs a laser beam L, a laser emitting head 20 that emits the laser beam L to a machining target (not illustrated), and a controller 15 that controls the operations of the laser oscillator 11 and the laser emitting head 20 and performs laser machining.

The laser oscillator 11 outputs the laser beam L based on an instruction from the controller 15. The laser oscillator 11 and the laser emitting head 20 are connected to each other via an optical fiber 12. The laser beam L is transmitted from the laser oscillator 11 to the laser emitting head 20 through the optical fiber 12.

The controller 15 is connected to the laser oscillator 11. The controller 15 has a function of controlling the moving speed of the laser emitting head 20, and has functions of controlling when to start or stop the output of the laser beam L, and controlling the output intensity of the laser beam L. A warning unit 18 that performs a predetermined warning operation is also connected to the controller 15.

The laser emitting head 20 is attached to a robot (not illustrated) and focuses the laser beam L on the machining target based on an instruction from the controller 15. The laser emitting head 20 includes a collimate lens 21 that changes the divergence angle of the laser beam L, a long-focus lens 22 that focuses the laser beam L which has passed through the collimate lens 21, a first parallel plate 25, and a second parallel plate 26 disposed closer to the incoming side than the first parallel plate 25.

The long-focus lens 22 is movable in the optical axis direction by a position adjuster 23. The position adjuster 23 adjusts the position of the long-focus lens 22 based on an instruction from the controller 15. Moving the position of the long-focus lens 22 in the optical axis direction can change the position of the focal point of the laser beam L.

The first parallel plate 25 and the second parallel plate 26 are disposed closer to the outgoing side than the long-focus lens 22 and inclined relative to the optical axis at predetermined angles. Each angle relative to the optical axis is not limited to a specific angle, and may be any angle at which the parallel plates easily reflect the laser beam L to a first detector 31, a second detector 32, and a third detector 33, which will be described later.

In the example of FIG. 1, the first parallel plate 25 and the second parallel plate 26 are inclined at certain angles in opposing directions so that the output end of the laser beam L is positioned at or near the center of the laser emitting head 20. However, the parallel plates are not limited thereto. For example, the first parallel plate 25 and the second parallel plate 26 may be inclined at certain angles in the same direction. In this case, the output end of the laser beam L is positioned away from the center portion of the laser emitting head 20.

The laser beam L output from the laser oscillator 11 is transmitted to the laser emitting head 20 through the optical fiber 12. The laser beam L that has entered the laser emitting head 20 is collimated by the collimate lens 21 and focused by the long-focus lens 22. The laser beam L focused by the long-focus lens 22 passes through the second parallel plate 26 and then the first parallel plate 25 that are controlled by the controller 15. The irradiation position of the laser beam L is determined accordingly, and the laser beam L is emitted to the machining target.

When the laser beam L is output at high-power levels (e.g., 4000 W), the first parallel plate 25 and the second parallel plate 26 in the laser emitting head 20 are heated and distorted, which causes thermal lens effect and changes the position of the focal point (i.e., a focal shift).

Thermal lens effect occurs when, as described above, a laser beam is output at high-power levels. It may also occur when, for example, fumes or dust created during laser machining adhere to the first parallel plate 25 and change the optical absorption coefficient of the first parallel plate 25, which can readily lead to thermal distortion.

In the present embodiment, the first detector 31, the second detector 32, and the third detector 33 are provided to detect whether a focal shift caused by thermal lens effect occurs.

Specifically, the first detector 31 detects an output of a reflected beam from an exit end surface of the first parallel plate 25. The second detector 32 detects an output of a reflected beam from an entrance end surface of the first parallel plate 25. The third detector 33 detects an output of a reflected beam from an entrance end surface of the second parallel plate 26.

Figure 2:
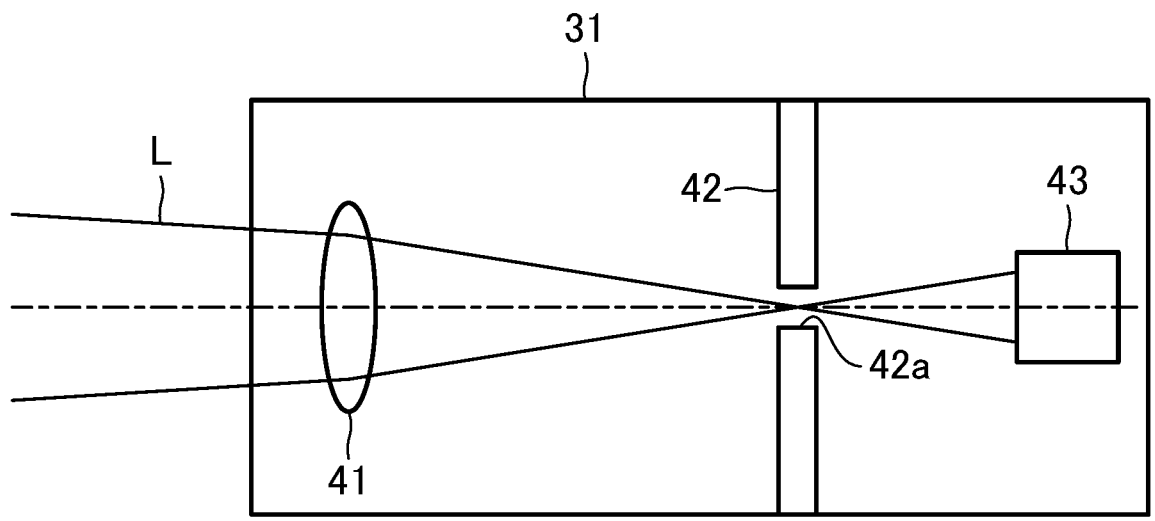
FIG. 2 is a side view illustrating a general configuration of a first detector.

As illustrated in FIG. 2, the first detector 31 includes a lens 41 that focuses the reflected beam, an aperture 42, and a photodiode 43. The second detector 32 and the third detector 33 have the same or similar structure as that of the first detector 31, and thus the description thereof is omitted.

The aperture 42 is disposed between the lens 41 and the photodiode 43, and has an opening 42a through which the reflected beam passes. A reflected beam having a diameter larger than the diameter of the opening 42a is blocked by the aperture 42.

Specifically, as illustrated in FIG. 2, when the focal point of the reflected beam focused by the lens 41 is in the opening 42a of the aperture 42, the reflected beam is incident on the photodiode 43 without being blocked by the aperture 42.

Figure 3:
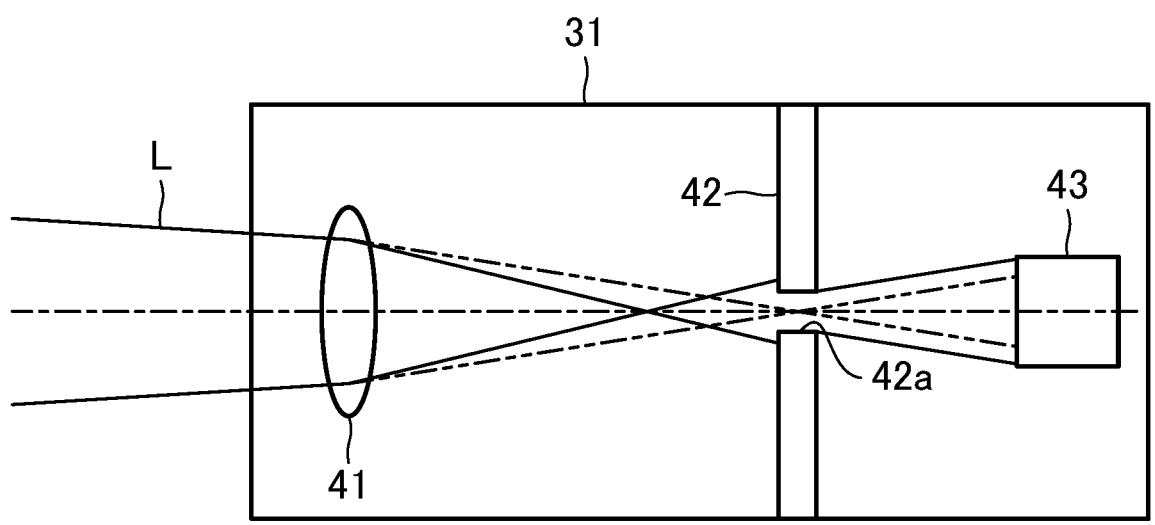
FIG. 3 is a diagram corresponding to FIG. 2 in a case in which a focal shift occurs.

As illustrated in FIG. 3, when the focal point of the reflected beam focused by the lens 41 is located closer to the incoming side than the aperture 42, the diameter of the reflected beam increases toward the aperture 42 from the focal point. The reflected beam radially larger than the opening 42a is therefore blocked by the aperture 42 and the rest of the reflected beam not blocked by the aperture 42 is incident on the photodiode 43.

In a case in which a focal shift due to thermal lens effect occurs, the reflected beam incident on the photodiode 43 is reduced compared to a case without a focal shift. As a result, the photodiode 43 detects a smaller output of the reflected beam. The occurrence of the focal shift can be detected based on the detection result of the photodiode 43.

Signals indicating the outputs of reflected beams detected by the first detector 31, the second detector 32, and the third detector 33 are transmitted to the controller 15. The controller 15 includes a determination unit 16 and a calculation unit 17.

The determination unit 16 determines whether an abnormality occurs in the first parallel plate 25 and the second parallel plate 26 based on detection values of the first detector 31, the second detector 32, and the third detector 33.

Specifically, when the detection value of the first detector 31 is smaller than a predetermined determination threshold, the determination unit 16 determines that an abnormality, such as adhesion of contamination, occurs in the first parallel plate 25. This configuration allows detection whether a focal shift caused by thermal lens effect occurs in the first parallel plate 25.

The determination threshold may be, for example, an output value of the reflected beam from the first parallel plate 25 in the initial state with no contamination attached.

The determination unit 16 may determine that the abnormality occurs in the first parallel plate 25 by comparing the detection value of the first detector 31 with the detection value of the second detector 32. Specifically, the calculation unit 17 calculates a difference between the detection value of the first detector 31 and the detection value of the second detector 32. When the difference is larger than a predetermined difference threshold, the determination unit 16 determines that an abnormality occurs in the first parallel plate 25.

That is, since in the first parallel plate 25 contamination such as fumes or dust adheres to the exit end surface, it is determined that a focal shift caused by thermal lens effect occurs in the first parallel plate 25 if the ratio between the detection value of the first detector 31 and the detection value of the second detector 32 differs from the ratio in the initial state of the first parallel plate 25 without contamination.

The determination unit 16 determines that an abnormality occurs in the second parallel plate 26 by comparing the detection value of the second detector 32 with the detection value of the third detector 33. Specifically, the calculation unit 17 calculates a difference between the detection value of the second detector 32 and the detection value of the third detector 33. When the difference is larger than a predetermined difference threshold, the determination unit 16 determines that an abnormality occurs in the second parallel plate 26.

Thus, it is determined that a focal shift due to thermal lens effect occurs in the second parallel plate 26 if the output of the reflected beam from the entrance end surface of the second parallel plate 26 differs from the output of the reflected beam from the entrance end surface of the first parallel plate 25.

The controller 15 causes the warning unit 18 to perform a warning operation based on the result of the abnormality determination by the determination unit 16. Specifically, the warning unit 18 performs the warning operation such as sounding a warning buzzer, lighting a warning lamp, or displaying a warning message. This configuration prompts the operator to replace or clean the first parallel plate 25 or the second parallel plate 26.

The calculation unit 17 calculates an amount of a focal shift of the first parallel plate 25 based on the detection value of the first detector 31 and the detection value of the second detector 32. The calculation unit 17 also calculates an amount of a focal shift of the second parallel plate 26 based on the detection value of the second detector 32 and the detection value of the third detector 33.

The controller 15 controls the position adjuster 23 to move the long-focus lens 22 in the optical axis direction and adjust the detection value of the first detector 31 to exceed a predetermined set value.

Specifically, when contamination is attached to the first parallel plate 25, the contaminated portion absorbs the laser beam and reduces the laser output to or below 3000 W, for example. In this case, the long-focus lens 22 is moved so that the laser output becomes maximum (e.g., 4000 W). The long-focus lens 22 is automatically adjusted in this manner to maximize the detection value of the first detector 31, and the focal shift at the laser machining point can be corrected.

When the detection value of the first detector 31 is smaller than the set value after adjustment of the position of the long-focus lens 22, the warning unit 18 performs the predetermined warning operation to prompt the operator to replace or clean the first parallel plate.

In the present embodiment, a focal shift is corrected by moving the long-focus lens 22 in the optical axis direction. However, the focal shift may be corrected by, for example, moving the collimate lens 21 in the optical axis direction. In the case of moving the collimate lens 21, it is possible to make a greater focal shift with respect to the moving amount of the collimate lens 21.

As can be seen from the foregoing description, according to the present invention, it is possible to detect whether a focal shift caused by thermal lens effect occurs, which is very practical and useful and therefore highly applicable in the industry.

What is claimed is:

1. A laser machining device configured to emit a laser beam, the laser machining device comprising:
    a collimate lens;
    a long-focus lens configured to focus the laser beam which has passed through the collimate lens;
    a first parallel plate disposed closer to an outgoing side than the long-focus lens and inclined relative to an optical axis at an angle;
    a second parallel plate disposed closer to an incoming side than the first parallel plate;
    a first detector configured to detect a first output of the laser beam which has been reflected from an exit end surface of the first parallel plate;
    a second detector configured to detect a second output of the laser beam which has been reflected from an entrance end surface of the first parallel plate;
    a third detector configured to detect a third output of the laser beam which has been reflected from an entrance end surface of the second parallel plate; and
    a controller configured to calculate an amount of a focal shift of the second parallel plate based on a detection value indicating the second output of the laser beam detected by the second detector and a detection value indicating the third output of the laser beam detected by the third detector, the amount of the focal shift of the second parallel plate being generated by distortion of the second parallel plate,
    wherein the first parallel plate is disposed to keep contamination from adhering to the second parallel plate.

2. The laser machining device of claim 1, wherein
    the controller is further configured to determine that an abnormality occurs in the first parallel plate when a detection value indicating the first output of the laser beam detected by the first detector is smaller than a determination threshold.

3. The laser machining device of claim 1, wherein
    the controller is further configured to calculate an amount of a focal shift of the first parallel plate based on a detection value indicating the first output of the laser beam detected by the first detector and the detection value indicating the second output of the laser beam detected by the second detector.

4. The laser machining device of claim 1, wherein
    the long-focus lens is configured to move in a direction of the optical axis such that a detection value indicating the first output of the laser beam detected by the first detector exceeds a set value.

5. The laser machining device of claim 4, further comprising
    an alarm configured to perform a warning operation when the detection value indicating the first output of the laser beam detected by the first detector is smaller than the set value after movement of the long-focus lens.

6. The laser machining device of claim 1, wherein the controller is further configured to:
    calculate a difference between a detection value indicating the first output of the laser beam detected by the first detector and the detection value indicating the second output of the laser beam detected by the second detector; and
    determine that an abnormality occurs in the first parallel plate when the difference between the detection value indicating the first output of the laser beam detected by the first detector and the detection value indicating the second output of the laser beam detected by the second detector is larger than a difference threshold.

7. The laser machining device of claim 1, wherein the first detector includes:
    a lens configured to focus the laser beam which has been reflected from the exit end surface of the first parallel plate;
    an aperture configured to block the laser beam which has been reflected from the exit end surface of the first parallel plate and has a diameter; and
    a photodiode configured to detect the first output of the laser beam which has passed through the aperture.

8. The laser machining device of claim 1, wherein the first parallel plate and the second parallel plate are inclined at angles in opposing directions.

* * * * *